(12) United States Patent
Anazawa et al.

(10) Patent No.: US 12,143,273 B2
(45) Date of Patent: Nov. 12, 2024

(54) TECHNIQUES FOR GENERATING NETWORK TOPOLOGIES THAT ACCOMMODATE DIFFERENT TRAFFIC DEMANDS

(71) Applicant: NIPPON TELEGRAPH AND TELEPHONE CORPORATION, Tokyo (JP)

(72) Inventors: Kazuya Anazawa, Musashino (JP); Toru Mano, Musashino (JP); Takeru Inoue, Musashino (JP); Atsushi Taniguchi, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/781,431

(22) PCT Filed: Dec. 5, 2019

(86) PCT No.: PCT/JP2019/047713
§ 371 (c)(1),
(2) Date: Jun. 1, 2022

(87) PCT Pub. No.: WO2021/111607
PCT Pub. Date: Jun. 10, 2021

(65) Prior Publication Data
US 2023/0013105 A1 Jan. 19, 2023

(51) Int. Cl.
*H04L 41/12* (2022.01)
*H04L 41/0816* (2022.01)
*H04L 41/0896* (2022.01)

(52) U.S. Cl.
CPC ......... *H04L 41/12* (2013.01); *H04L 41/0816* (2013.01); *H04L 41/0896* (2013.01)

(58) Field of Classification Search
CPC . H04L 41/12; H04L 41/0816; H04L 41/0896; H04L 41/142; H04L 41/145; H04L 41/147
See application file for complete search history.

(56) References Cited

U.S. PATENT DOCUMENTS 9,184,999 B1 11/2015 Kabbani et al.
11,184,248 B1 * 11/2021 Ahuja ............... H04L 47/823
(Continued)

FOREIGN PATENT DOCUMENTS

WO WO-2004086697 A1 10/2004

OTHER PUBLICATIONS

M. Gerla, and L. Kleinrock, "On the topological design of distributed computer networks," in IEEE Transactions on communications, vol. 25, No. 1, pp. 48-60, 1977.
(Continued)

*Primary Examiner* — Tonia L Dollinger
*Assistant Examiner* — Joseph M Cousins
(74) *Attorney, Agent, or Firm* — Harness, Dickey & Pierce, P.L.C.

(57) ABSTRACT

It is an objective of the present disclosure to reduce computational complexity for obtaining a network topology configuration capable of efficiently accommodating a plurality of traffic demands assumed between nodes present in a network.
A device of the present disclosure includes: a computation traffic generation unit that creates a traffic demand matrix whose elements are values individually obtained by demands between nodes present in a target network area from a plurality of traffic demand matrices created based on predicted traffic demands between the nodes; and a network topology generation unit that generates a network topology
(Continued)

based on the traffic demand matrix generated by the computation traffic generation unit and port information of the nodes in the network area.

3 Claims, 14 Drawing Sheets

(56) References Cited

U.S. PATENT DOCUMENTS

| | | | |
|---|---|---|---|
| 2009/0219835 A1* | 9/2009 | Bandholz | H04L 41/0823 |
| | | | 370/255 |
| 2015/0327135 A1* | 11/2015 | Luo | H04W 36/08 |
| | | | 370/238 |
| 2016/0218948 A1* | 7/2016 | Djukic | H04L 41/0895 |
| 2019/0268234 A1 | 8/2019 | Cheng et al. | |

OTHER PUBLICATIONS

N. Kamiyama, "Designing network topology using data envelopment analysis," Journal of the Operations Research Society of Japan, vol. 56, No. 3, pp. 199-220, 2013.

* cited by examiner

TRAFFIC DEMAND MATRIX $T_k$

| $T_k$ | $v_1$ | $v_2$ | $v_3$ | $v_4$ | $v_5$ |
|---|---|---|---|---|---|
| $v_1$ | 0 | $t^k_{12}$ | $t^k_{13}$ | $t^k_{14}$ | $t^k_{15}$ |
| $v_2$ | $t^k_{21}$ | 0 | $t^k_{23}$ | $t^k_{24}$ | $t^k_{25}$ |
| $v_3$ | $t^k_{31}$ | $t^k_{32}$ | 0 | $t^k_{34}$ | $t^k_{35}$ |
| $v_4$ | $t^k_{41}$ | $t^k_{42}$ | $t^k_{43}$ | 0 | $t^k_{45}$ |
| $v_5$ | $t^k_{51}$ | $t^k_{52}$ | $t^k_{53}$ | $t^k_{54}$ | 0 |

SET OF TRAFFIC DEMAND MATRICES T = {$T_1, ..., T_m$}

TRAFFIC DEMAND MATRIX $T_1$

| $T_1$ | $v_1$ | $v_2$ | $v_3$ | $v_4$ | $v_5$ |
|---|---|---|---|---|---|
| $v_1$ | 0 | 0.18 | 0.48 | 2.77 | 0.02 |
| $v_2$ | 0.19 | 0 | 0.44 | 0 | 0.68 |
| $v_3$ | 0.01 | 0.14 | 0 | 0 | 0.33 |
| $v_4$ | 0 | 0 | 1.22 | 0 | 0.01 |
| $v_5$ | 0.2 | 2.17 | 0.58 | 0.01 | 0 |

⋮

TRAFFIC DEMAND MATRIX $T_m$

| $T_m$ | $v_1$ | $v_2$ | $v_3$ | $v_4$ | $v_5$ |
|---|---|---|---|---|---|
| $v_1$ | 0 | 1.44 | 0 | 0.04 | 0.81 |
| $v_2$ | 0.02 | 0 | 0.04 | 0.02 | 2.46 |
| $v_3$ | 0.01 | 0 | 0 | 2.44 | 0.02 |
| $v_4$ | 0.27 | 0 | 1.02 | 0 | 0.05 |
| $v_5$ | 0.03 | 0.02 | 0.44 | 0.01 | 0 |

TECHNIQUES FOR GENERATING NETWORK TOPOLOGIES THAT ACCOMMODATE DIFFERENT TRAFFIC DEMANDS

CROSS-REFERENCE TO RELATED APPLICATIONS

This application is a 371 U.S. National Phase of International Application No. PCT/JP2019/047713, filed on Dec. 5, 2019. The entire disclosure of the above application is incorporated herein by reference.

TECHNICAL FIELD

The present disclosure relates to a method for quickly obtaining a network topology capable of efficiently accommodating a plurality of traffic demands assumed between nodes.

BACKGROUND ART

Previously, methods for designing and configuring an optimal network topology by considering cost, redundancy and the like based on a traffic demand matrix estimated from distribution of population, previous traffic demands and the like have been proposed (for example, see Non-Patent Literatures 1 and 2). However, in the prior art, methods have been proposed for configuring an optimal physical topology for a fixed traffic demand matrix on the assumption that no significant variation or structural change in traffic demands would occur. On the other hand, in the future, with the deployment of micro-cloud services and the spread of new services such as autonomous vehicles, traffic demands occurring between nodes in networks may come to have different characteristics than before, and the traffic demand matrix may structurally change over time, that is, a plurality of different traffic demand matrices may be assumed. What is needed is a new method for configuring a network topology capable of efficiently accommodating all of them even in such cases.

CITATION LIST

Non-Patent Literature

Non-Patent Literature 1: M. Gerla, and L. Kleinrock, "On the topological design of distributed computer networks," in IEEE Transactions on communications, vol. 25, no. 1, pp. 48-60, 1977.
Non-Patent Literature 2: N. Kamiyama, "Designing network topology using data envelopment analysis," Journal of the Operations Research Society of Japan, vol. 56, no. 3, pp. 199-220, 2013.

SUMMARY OF THE INVENTION

Technical Problem

When a set of traffic demand matrices that can occur according to an assumption scenario or model is given, a problem to configure a network topology capable of evenly accommodating all of them is formulated as a mixed integer linear programming problem. However, in the case of solving this problem by full search, the computational complexity exponentially increases with the number of nodes, and it becomes difficult to obtain an exact solution. Thus, a method for quickly obtaining an approximate solution of this problem with a small computational complexity is needed.

An object of the present disclosure is to reduce the computational complexity for obtaining a network topology configuration capable of efficiently accommodating a plurality of traffic demands assumed between nodes present in a network.

Means for Solving the Problem

The present disclosure proposes a method for formulating the above-mentioned problem as a degree-constrained network design problem for which the number of ports of a node is given as a degree constraint and quickly obtaining an approximate solution thereof.

A device of the present disclosure includes:
a computation traffic generation unit that creates a traffic demand matrix whose elements are values individually obtained by demands between nodes present in a target network area from a plurality of traffic demand matrices created based on predicted traffic demands between the nodes; and
a network topology generation unit that generates a network topology based on the traffic demand matrix generated by the computation traffic generation unit and port information of the nodes in the network area.

A method of the present disclosure includes:
creating a traffic demand matrix whose elements are values individually obtained by demands between nodes present in a target network area from a plurality of traffic demand matrices created based on predicted traffic demands between the nodes; and
generating a network topology based on the generated traffic demand matrix and port information of the nodes in the network area.

A program of the present disclosure is a program for causing a computer to perform:
a step of creating a traffic demand matrix whose elements are values individually obtained by demands between nodes present in a target network area from a plurality of traffic demand matrices created based on predicted traffic demands between the nodes; and
a step of generating a network topology based on the generated traffic demand matrix and port information of the nodes in the network area.

Effects of the Invention

According to the present disclosure, it is possible to obtain a network topology configuration capable of efficiently accommodating a plurality of traffic demands assumed between nodes present in a network with a significantly reduced computational complexity, in a shorter time and with lower cost over the prior art.

BRIEF DESCRIPTION OF DRAWINGS

FIG. 3 is an example of a traffic demand matrix.
FIG. 4 is an example of a set of traffic demand matrices.

DESCRIPTION OF EMBODIMENTS

Embodiments of the present disclosure will be described in detail below with reference to the drawings. Note that the present disclosure is not limited to the embodiments illustrated below. These example embodiments are merely illustrative, and the present disclosure can be carried out with various modifications and improvements based on knowledge of those skilled in the art. Note that components with the same reference signs in the description and the drawings mutually indicate the same things.

Figure 1:
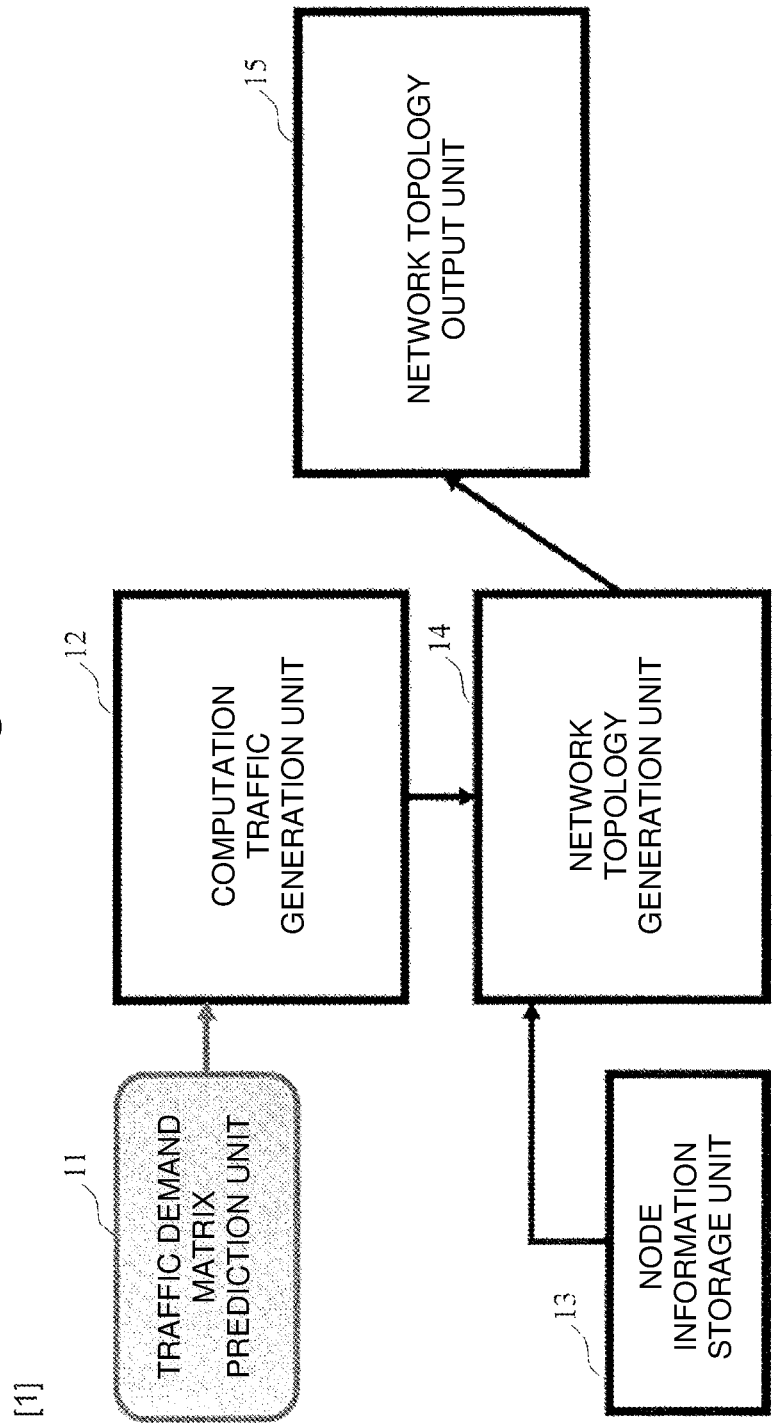
FIG. 1 is an example of a block diagram of the present disclosure.

FIG. 1 is a block diagram showing a schematic configuration of functions required for determining a network topology configuration in the present embodiment. First, each of these functions will be described. A system of the present embodiment includes a traffic demand matrix prediction unit 11, a computation traffic generation unit 12, a node information storage unit 13, a network topology generation unit 14, and a network topology output unit 15. A device of the present disclosure can also be realized by a computer and a program, and it is also possible that the program is recorded on a recording medium or provided through a network.

The traffic demand matrix prediction unit 11 is a function of predicting a plurality of traffic demands that can occur between nodes in a target network and generating a set of the traffic demands. Possible examples of the traffic demand matrix prediction unit when designing or operating an actual network are as follows.

(1) Predicting and generating traffic demand matrices that will occur between nodes in the future at constant time intervals based on logs and data collected from a network traffic monitoring device, previous traffic information and the like.

(2) Generating a plurality of possible traffic demand matrices from external information (information on the flow of population, events, seasons and the like).

(3) Modeling characteristics of the target network for network designers or operators and generating a plurality of traffic demand matrices assumed from the model.

The computation traffic generation unit 12 is a function of generating a traffic demand matrix or a set of traffic demand matrices as input instances for generating a network topology from a set of traffic demand matrices given by the traffic demand matrix prediction unit 11. As an example, to evenly accommodate traffic demands that can occur, an averaged demand at each node is obtained from a plurality of assumed traffic demand matrices, and a network topology is generated based on the averaged demand.

In addition, to design a topology in consideration of peak values, one traffic demand matrix whose elements are the maximum demands occurring at each node is generated from a plurality of assumed traffic demand matrices, and a network topology is generated based on the traffic demand matrix. Furthermore, it is also possible that a traffic demand matrix indicating average demands between the nodes as discussed above and a traffic matrix whose elements are the maximum demands that can occur between the nodes are both generated to generate a network topology in consideration of variation from these two pieces of information.

The node information storage unit 13 is a database for holding port information (the number of ports, link capacity and the like) and positional information of each node in the network, each of which is input information to the network topology generation unit 14. The network topology generation unit 14 generates one or more network topologies that can be a solution, from traffic demand matrices generated by the computation traffic generation unit 12 or a set of them. When a plurality of solution candidates are generated, one final network topology configuration is determined by the network topology output unit 15.

Specific operation examples of functional blocks and calculation examples thereof, proposed by the inventors, are shown below. First, in order to describe the operation examples of the functional blocks and the calculation examples, a model of a network and a traffic demand matrix will be described. Next, formulation of a problem will be performed based on the model, and a technique for quickly obtaining a network topology capable of efficiently accommodating a plurality of assumed traffic demands between nodes will be proposed. The technique proposed here by the inventors adopts a method of calculating (generating by the computation traffic generation unit 12) an average traffic demand occurring between nodes for a given set of traffic demand matrices and establishing (generating by the network topology generation unit 14) links between nodes with higher demands on a priority basis, based on the average traffic demand. As other methods, it is possible to obtain an approximate solution based on meta-heuristics such as simulated annealing or genetic algorithm.

1. Modeling of Network and Traffic

Figure 2:
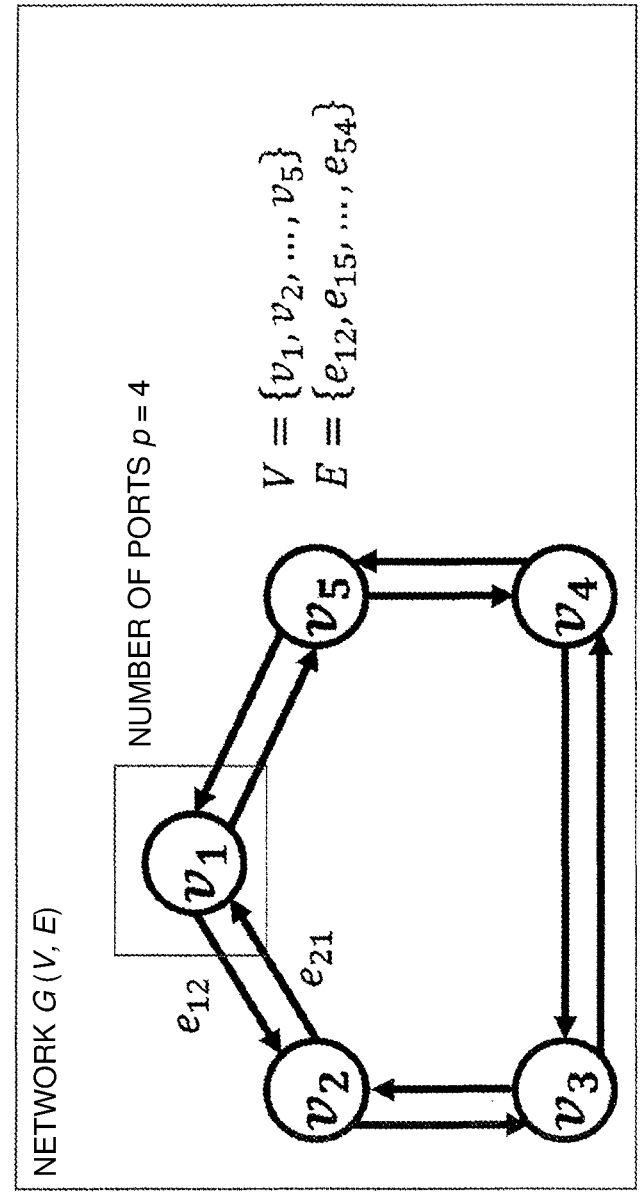
FIG. 2 is an example of a network consisting of five nodes that each have ports the number of which is p=4.

In FIG. 2, an example of models of a network and traffic used in the present disclosure is illustrated. In the present disclosure, a network is represented by a directed graph $G=(V,E)$. The letter V indicates a set consisting of n nodes ($V=\{v_1, v_2, \ldots, v_n\}$, $|V|=n$), and the letter E indicates a set of links. A link between nodes $v_i$ and $v_j$ is represented by $e_{ij} \in E$. In addition, the number of ports of each node is limited and is expressed as $p(<\infty)$. In FIG. 2, as an example of a network, an example in which the number of nodes n is 5 and the number of ports of each node is 4 is illustrated. This example is represented as $V=\{v_1, v_2, \ldots, v_5\}$, $E=\{e_{12}, e_{15}, \ldots, v_{54}\}$.

Furthermore, a band that can be provided by one link is indicated as B, and a link capacity provided between nodes $v_i$ and $v_j$ is expressed as $B_{ij}$. For example, when three links are created between nodes $v_i$ and $v_j$, $B_{ij}=3*B$. Thus, the network targeted for the problem is modeled as a degree-constrained valid graph G=(V,E).

Next, a model of traffic will be described. A traffic demand between nodes $v_i$ and $v_j$ is represented as $t_{ij}$, and a n×n traffic demand matrix each element of which is indicated as $t_{ij}$ is indicated as $T=\{t_{ij}\}$. Here, a traffic demand to the same node is not considered. That is, for every node $v_i \in V$, $t_{ii}=0$. In addition, a set of m traffic demand matrices that can occur in an assumption scenario or model is expressed as $T_s=\{T_1, T_2, \ldots, T_m\}$, and each element of a traffic demand matrix $T_k = \in T_s$ is represented as $t_{ij}^k$. In FIGS. 3 and 4, an example of the traffic demand matrix and the set thereof is illustrated.

2. Formulation of Problem

Based on the models of the network and the traffic demands discussed in chapter 1, a problem (P1) to maximize the accommodation volume of the traffic demand matrix T on the graph G is formulated. Each traffic volume that can pass from a source node $v_s$ to a destination node $v_d$ is represented as $f_{sd}$. In addition, the ratio at which each traffic volume from the source node $v_s$ to the destination node $v_d$ passes through a link established between the nodes $v_i$ and $v_j$ is indicated as $x_{ij}^{sd}$. Then, the problem (P1) can be formulated as follows.

Problem (P1):

A problem to determine the maximum accommodation volume of the traffic demand matrix T on the graph G

[Input]
The graph G and the traffic demand matrix T

[Output]
The maximum accommodation volume of the traffic demand matrix T that can be accommodated on the graph G

[Objective Function]
Maximizing the sum of traffic volumes $\Sigma_{s,d} f_{sd}$ that can pass between nodes $v_s$ and $v_d$

[Constraint Condition]
Constraint Condition 1

[Math. 1]

$$\Sigma_{s,d} x_{ij}^{sd} t_{sd} \leq B_{ij}, \forall v_i, v_j \in VL \qquad (1)$$

A constraint under which the traffic volume flowing between nodes $v_i$ and $v_j$ must not exceed the link capacity $B_{ij}$ provided therebetween Constraint Condition 2

[Math. 2]

$$\sum_{j:e_{ij} \in E} x_{ij}^{sd} t_{sd} - \sum_{j:e_{ji} \in E} x_{ji}^{sd} t_{sd} = \begin{cases} f_{sd}, & v_i = s, s \neq d; \\ -f_{sd}, & v_i = d, s \neq d; \\ 0, & v_i \neq s, d; \end{cases} \qquad (2)$$

A constraint regarding flow conservation

Constraint Condition 3

[Math. 3]

$$0 \leq x_{ij}^{sd} \leq 1, \forall e_{ij} \in E, \forall s,d \in V \qquad (3)$$

A range of values that can be taken by the variable $x_{ij}^{sd}$

Constraint Condition 4

[Math. 4]

$$0 \leq f_{sd} \leq t_{sd}, \forall s,d \in V \qquad (4)$$

A range of values that can be taken by the variable $f_{sd}$

Next, a problem (P2) to obtain a topology (this is expressed as $G^s$) capable of evenly accommodating the given set of traffic demand matrices $T_s=\{T_1, T_2, \ldots, T_m\}$ is formulated. When the traffic accommodation volume obtained by solving the problem (P1) for the graph G and the traffic demand matrix T is represented as P (G,T), this problem (P2) can be formulated as follows.

Problem (P2):

A problem to determine the topology $G^s$ capable of evenly accommodating demand matrices on the traffic demand matrix T

[Input]
The set of nodes $V=\{v_1, v_2, \ldots, v_n\}$
The set of traffic demand matrices $T_s=\{T_1, T_2, \ldots, T_m\}$

[Output]
A set of physical links $l_{ij}$, i.e., a configuration of the graph G

The physical links $l_{ij}$ defined below
$l_{ij}$=the number of links established between $v_i$ and $v_j$

[Objective Function]
Maximizing the sum of accommodation volumes of individual traffic demand matrices $T \in T_s$ for the set of traffic demand matrices $T_s=\{T_1, T_2, \ldots, T_m\}$ $$\Sigma_{T_k T_s} P(G,T)$$

[Constraint Condition]
Since no link is established between the same nodes, the following constraint condition 1 is considered.

Constraint Condition 1

[Math. 5]

$$l_{ii}=0, \forall v_i \in V \qquad (5)$$

In addition, since the number of ports of each node is limited, the following constraint conditions 2 and 3 are considered for the number of links $l_{ij}$ that can be established between $v_i$ and $v_j$.

Constraint Condition 2

[Math. 6]

$$0 \leq l_{ij} \leq p, \forall v_i, v_j \in V \qquad (6)$$

A constraint under which the number of links that can be established between all nodes $v_i$ and $v_j$ does not exceed the number of ports p of the nodes.

Constraint Condition 3

[Math. 7]

$$0 \leq \Sigma_j l_{ij} + \Sigma_j l_{ji} \leq p, \forall v_i \in V \qquad (7)$$

A constraint for each node $v_i$ under which the sum of the number of links established from $v_i$ to another node $v_j$ and the number of links established from another node $v_j$ to $v_i$ does not exceed the number of ports p of $v_i$.

3. Computational Complexity by Full Search

In this chapter, the computational complexity required for obtaining the problem formulated in chapter 1 by full search will be described. It can be understood from the constraint conditions 1 and 2 of the problem (P2) that the number of decision variables $l_{ij}$ and the possible value thereof are $n(n-1)$ and $p+1$, respectively. Therefore, to list all network topology configurations, a computational complexity of $O((p+1)^{n(n-1)})$ is required.

In order to obtain a desired solution, all of these cases are listed, and from them, only those that satisfy the constraint conditions 1 to 3 of the problem (P2) are extracted as solution candidates. Then, an optimal solution can be obtained by calculating P (G,T) for all of the solution candidates. However, obtaining the optimal solution by the full search is unrealistic since the computational complexity exponentially increases with the number of nodes.

4. First Proposed Technique

In this chapter, the details of the technique proposed by the inventors are described, and a computational complexity thereby is analyzed. In addition, it is compared with the computational complexity by the full search discussed in chapter 3 to show that an approximate solution can be obtained quickly.

First, average values

[Math. 11]

$$\overline{t_{ij}} \tag{11}$$

of demands occurring between nodes $v_i$ and $v_j$ are calculated based on the given set of traffic demand matrices $T_s = \{T_1, T_2, \ldots, T_m\}$, and a traffic demand matrix having the average values as elements is generated. This is referred to as an average traffic demand matrix, and is represented as follows.

[Math. 12]

$$\overline{T} = \{\overline{t_{ij}}\} \tag{12}$$

A sign representing an average may be indicated by "$^{ave}$", and the average traffic demand matrix may be denoted as "$T^{ave}$", for example.

Here, each of the average values

[Math. 13]

$$\overline{t_{ij}} \tag{13}$$

of demands occurring between nodes $v_i$ and $v_j$ can be calculated as follows.

[Math. 14]

$$\overline{t_{ij}} = \frac{1}{|T_s|} \sum_{T^k \in T_s} t_{ij}^k, \forall v_i, v_j \in V \tag{14}$$

Figure 5:
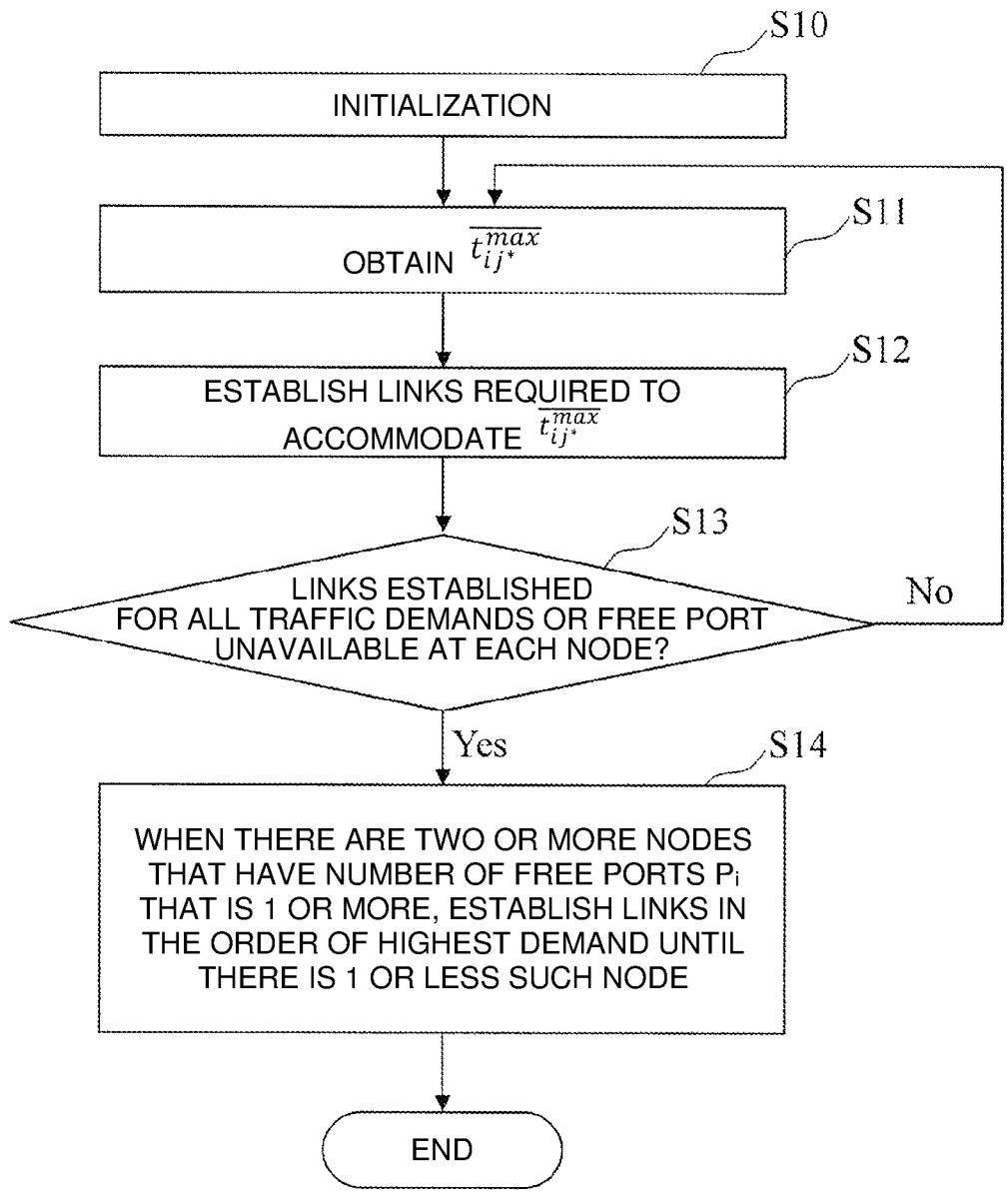
FIG. 5 is a flow diagram showing an example of a first proposed technique according to the present disclosure.

Based on the average traffic demand matrix $T^{ave}$ obtained by calculating this, the number of links $l_{ij}$ established between $v_i$ and $v_j$ is obtained in the following procedure shown in FIG. 5.

In the following,

[Math. 15]

$$\lceil x \rceil \tag{15}$$

represents a ceiling function, and a specific example thereof is below.

[Math. 16]

$$\lceil 1.3 \rceil = 2 \tag{16}$$

In addition, $P_i$ represents the number of free ports of the node $v_i$, and is updated every time a link is established.

Network configurations (indicated as $g_1, g_2, \ldots, g_n$, respectively) in the case of initially settings of the following processing procedure as $v_{start} = v_1, v_1, \ldots, v_n$, respectively, are obtained, and from the set of the obtained multiple network configurations

[Math. 17]

$$G^s \tag{17},$$

a graph that can most efficiently accommodate the average traffic demand matrix $T^{ave}$ is indicated as follows.

[Math. 18]

$$G^s \tag{18}$$

That is as follows.

[Math. 19]

$$G^s := \max_{G \in G^s} P(G, \overline{T}) \tag{19}$$

[Procedure S1]
Step S10. initialization:
$v_{start} = v_i$
$P_i = p$
$\forall v_i \in V$ Step S11. an unexamined node $v_{j*}$ with the largest average traffic demand to node $v_i$ and its value

[Math. 21]

$$\overline{t_{ij*}}^{max} \tag{21}$$

are obtained.
Here,

[Math. 22]

$$j^* = \underset{j}{\operatorname{argmax}}(\overline{t_{ij}}); \tag{22}$$

[Math. 23]

$$\overline{t_{ij*}}^{max} = \max_{j}(\overline{t_{ij}}); \tag{23}$$

are provided.
Step S12. Links required to accommodate

[Math. 24]

$$\overline{t_{ij*}}^{max} \tag{24}$$

are established between the nodes $v_i$ and $v_{j*}$.

If it is impossible to establish the required number of links due to limitation on the number of ports, the number of established links is as large as possible. Note that, if it is impossible to perform establishment due to limitation on the number of ports, establishment is not performed.

[Math. 25]

$$\text{If } \left(\left\lceil \frac{\overline{t_{ij*}}^{max}}{B} \right\rceil \leq P_i \wedge \left\lceil \frac{\overline{t_{ij*}}^{max}}{B} \right\rceil \leq P_{j*}\right):$$

it is possible to establish the number of links required for accommodating $\overline{t_{ij*}}^{max}$ at both of $v_i$ and $v_{j*}$

[Math. 26]

$$l_{ij^*} = \left\lceil \frac{\overline{t_{ij^*}^{max}}}{B} \right\rceil;$$

$P_i = P_i - l_{ij^*}$; update the number of free ports of $v_i$
$P_{j^*} = P_{j^*} - l_{ij^*}$; update the number of free ports of $v$;

[Math. 27]

$$\text{Else if } \left( \left\lceil \frac{\overline{t_{ij^*}^{max}}}{B} \right\rceil > P_i \vee \left\lceil \frac{\overline{t_{ij^*}^{max}}}{B} \right\rceil > P_{j^*} \right):$$

it is impossible to establish the number of links required for accommodating $t_{ij^*}^{max}$ at $v_i$ or $v_{j^*}$

[Math. 28]

$l_{ij^*} = \min(P_i, P_{j^*})$; //establish links that can be established
$P_i = P_i - l_{ij^*}$; update the number of free ports of $v_i$
$P_{j^*} = P_{j^*} - l_{ij^*}$; update the number of free ports of $v_j$
Step S13. The above processing terminates when the processing is performed for all traffic demands

[Math. 29]

$$\overline{t_{ij}} \tag{29}$$

or when there is no free port of each node, and the following step S14 is performed. Otherwise, $v_i$ is replaced with $v_{i+1}$ (when $i+1 > n$, $v_i$ is replaced with $v_1$), and the processing returns to step S11.

Step S14. If there are two or more nodes whose number of free ports $P_i$ is greater than or equal to 1, links are established between those nodes in the order from the highest demand. This operation is performed until the number of nodes is less than or equal to 1.

Since the steps from S11 to S14 are repeated $n^2 - n$ times at the maximum and these are performed for each case of $v_{start} = v_1, v_2, \ldots, v_n$, it is easy to understand that the computational complexity is $O(n^3)$. Thus, it can be understood that it is possible to obtain an approximate solution in a very short time as compared to the computational complexity $O((p+1) n(n-1))$ required in the case of performing full search.

In FIGS. 6 to 9, examples of this procedure and network topology configurations obtained thereby are illustrated.

Figure 6:
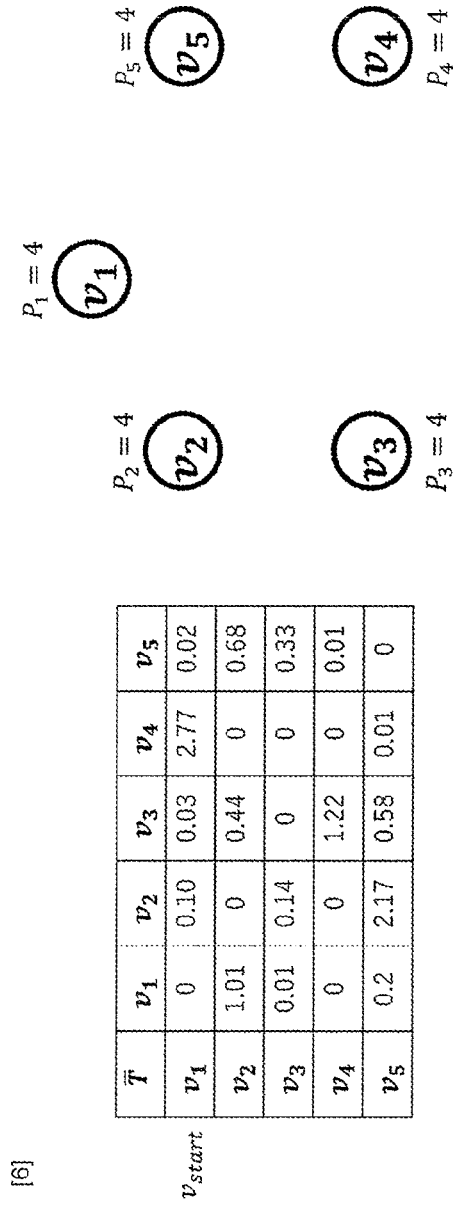
FIG. 6 is an illustrative diagram of an initial state in a network topology configuration example by the first proposed technique.

Step S10: as shown in FIG. 6, $v_{start} = v_i$, $P_i = 4$, $\forall v_i \in V$.

Step S11: from the table in FIG. 6, node $v_{j^*}$ with the largest average traffic demand to node $v_i$ is $v_4$, and its value $(t_1^{max})^{ave}$ is 2.77.

Figure 7:
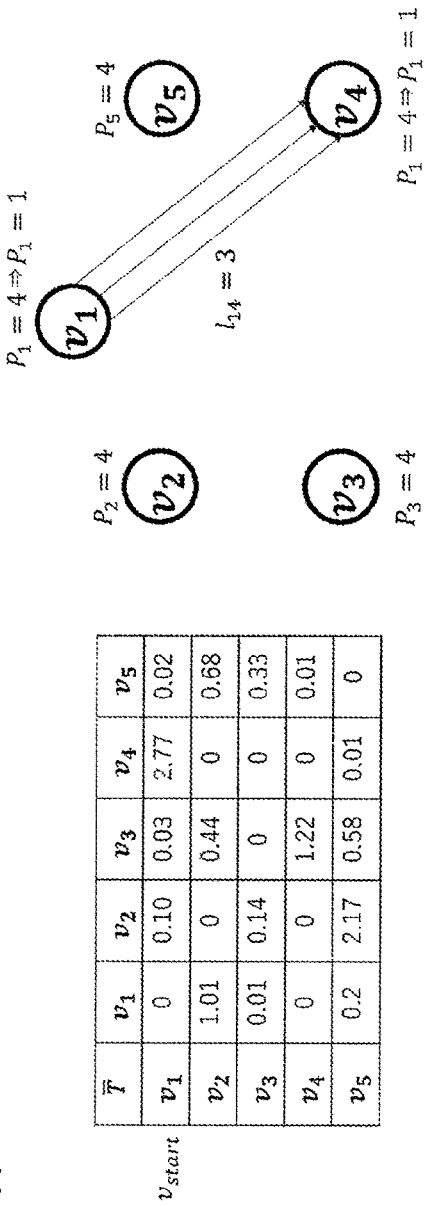
FIG. 7 is an illustrative diagram of steps S11 and S12 in the network topology configuration example by the first proposed technique.

Step S12: as shown in FIG. 7, links required to accommodate $(t_1^{max})^{ave} = 2.77$ are established between nodes $v_1$ and $v_4$. In the present embodiment, since $l_{ij} = |2.77/1.0| = 3$ and there are free ports at both of $v_i$ and $v_4$, $l_{14} = 3$. In addition, at each of the nodes, the number of free ports is updated.

Step S13: $v_s$ is set to $v_2$, and the processing returns to step S10.

Step S11: from the table in FIG. 6, node $v_{j^*}$ with the largest average traffic demand to node $v_2$ is $v_i$, and its value $(t_1^{max})^{ave}$ is 1.01.

Figure 8:
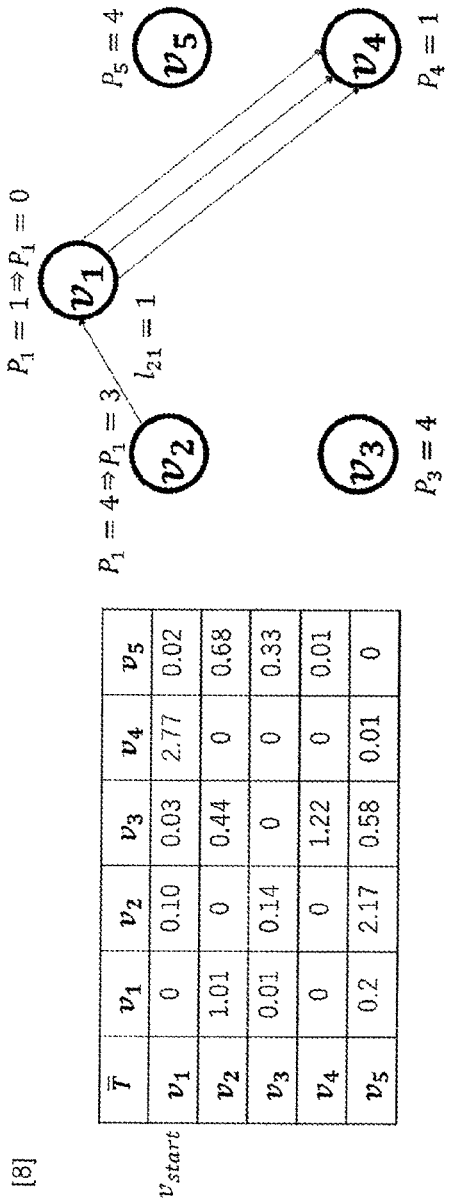
FIG. 8 is an illustrative diagram of steps S11 and S12 in the network topology configuration example by the first proposed technique.

Step S12: as shown in FIG. 8, links required to accommodate $(t_2^{max})^{ave} = 1.01$ are established between nodes $v_2$ and $v_1$. In the present embodiment, since $l_{ij} = |1.01/1.0| = 2$, the number of free ports at $v_i$ is 1, and thus setting is made such that $l_{21} = 1$. In addition, at each of the nodes, the number of free ports is updated. Step S14 is performed when links are established for the traffic demands of all nodes or when there is no free port to which a link with a traffic demand can be established.

Figure 9:
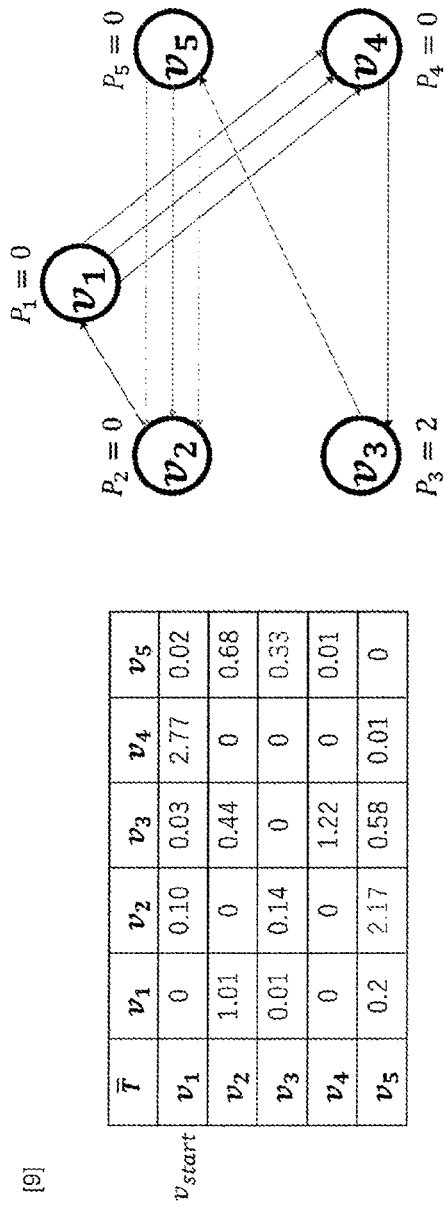
FIG. 9 is an example of a network configuration obtained by the first proposed technique.

By repeating these procedures, a network configuration as in FIG. 9 is finally obtained.

5. Second Proposed Technique

Figure 10:
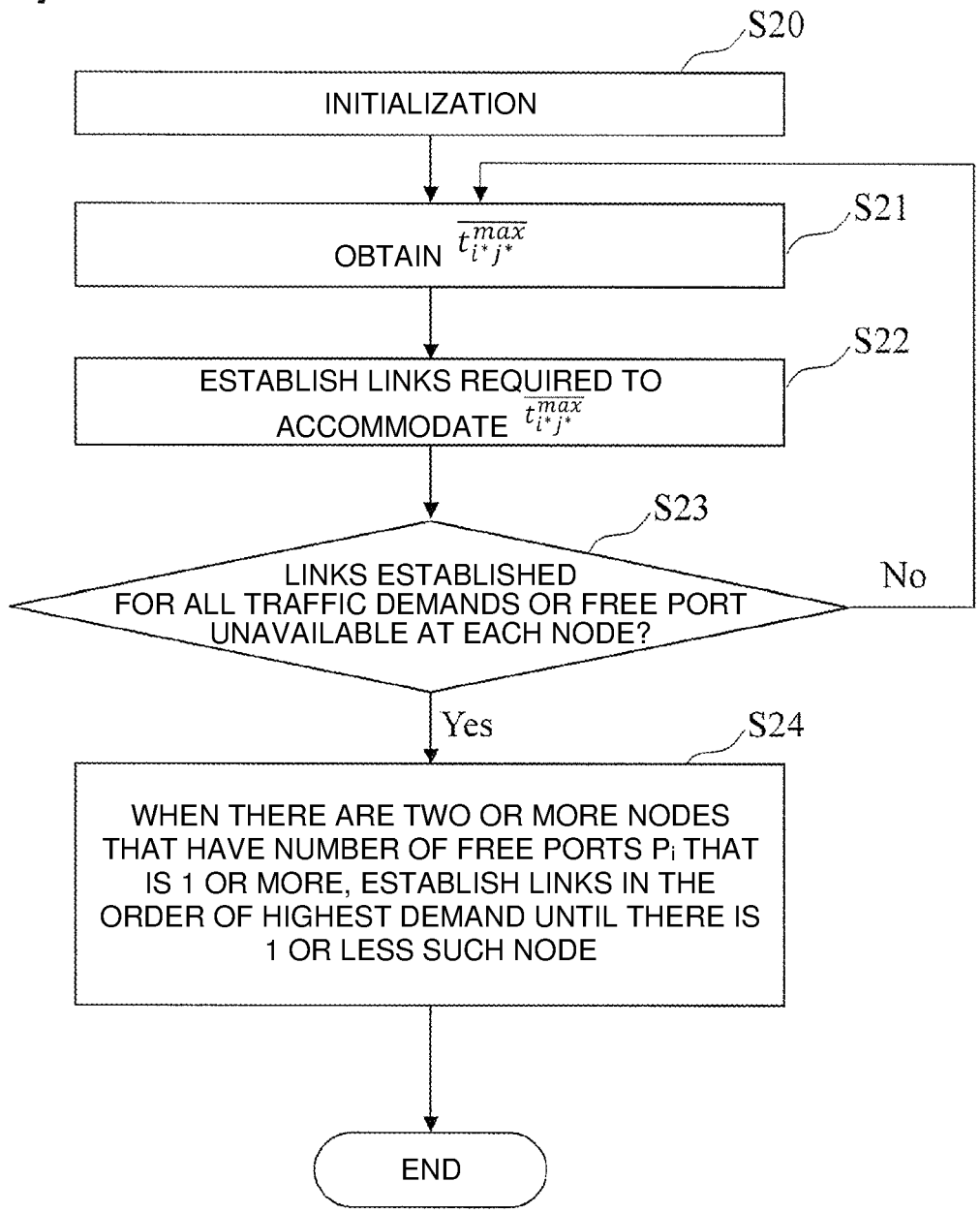
FIG. 10 is a flow diagram showing an example of a second proposed technique according to the present disclosure.

As another method for obtaining the network topology $G^s$, a method of sequentially selecting the maximum element of all elements of the average traffic demand matrix $T^{ave}$ and greedily establishing links in consideration of limitation on the number of ports is proposed. The following procedure S2 shown in FIG. 10 shows a link establishment method by this method. In addition, an example of this procedure and network topology configurations obtained by this example are illustrated in FIGS. 11 to 14.

In this case, since the number of elements of the average traffic demand matrix $T^{ave}$ is $n^2$, the computational complexity is $O(n^2)$, and it is possible to obtain an approximate solution with a very low computational complexity even in such a method.

[Procedure S2]

Step S20. Initialization:
$P_i = P$
$\forall v_i \in V$
In the example of FIG. 11, $P_i = 4$, $\forall v_i \in v$.

Step S21. A pair of nodes $v_{i^*}$ and $v_{j^*}$ with the largest traffic demand and its value

[Math. 31]

$$\overline{t_{i^*j^*}^{max}} \tag{31}$$

are obtained.
Here,

[Math. 32]

$$v_{i^*}, v_{j^*} = \underset{i,j}{\operatorname{argmax}}\left(\overline{t_{ij}}\right); \tag{32}$$

$$\overline{t_{i^*j^*}^{max}} = \max_{i,j}(\overline{t_{ij}});$$

are provided.

Step S22. Links required to accommodate

[Math. 33]

$$\overline{t_{i^*j^*}^{max}} \tag{33}$$

are established between nodes $v_{i^*}$ and $v_{j^*}$.

If it is impossible to establish the required number of links due to limitation on the number of ports, the number of established links is as large as possible. If it is impossible to perform establishment due to limitation on the number of ports, it is not performed.

[Math. 34]

$$\text{If } \left( \left\lceil \frac{\overline{t_{i^*j^*}^{max}}}{B} \right\rceil \leq P_{i^*} \wedge \left\lceil \frac{\overline{t_{i^*j^*}^{max}}}{B} \right\rceil \leq P_{j^*} \right):$$

it is possible to establish the number of links required for accommodating $\overline{t_{i^*j^*}^{max}}$ at both of $v_i$ and $v_j$.

$$l_{i^*j^*} = \left\lceil \frac{t_{i^*j^*}^{max}}{B} \right\rceil;$$

$P_{i^*}=P_{i^*}-l_{i^*j^*}$; update the number of free ports of $v_i$
$P_{j^*}=P_{j^*}-l_{i^*j^*}$; update the number of free ports of $v_j$.

[Math. 35]

$$\text{Else if } \left( \left\lceil \frac{t_{i^*j^*}^{max}}{B} \right\rceil > P_{i^*} \vee \left\lceil \frac{t_{i^*j^*}^{max}}{B} \right\rceil > P_{j^*} \right):$$

$l_{i^*j^*}=\min(P_{i^*}, P_{j^*})$; //establish as possible
$P_{i^*}=P_{i^*}-l_{i^*j^*}$; update the number of free ports of $v_i$
$P_{j^*}=P_{j^*}-l_{i^*j^*}$; update the number of free ports of $v_j$.

In the examples of FIGS. 11 to 14, steps S21 and S22 are performed as follows.

Step S21: $v_{i^*}=v_1$, $v_{j^*}=4$, and its value $(t_{i^*j^*}^{max})^{ave}$ is 2.77.

Figure 11:
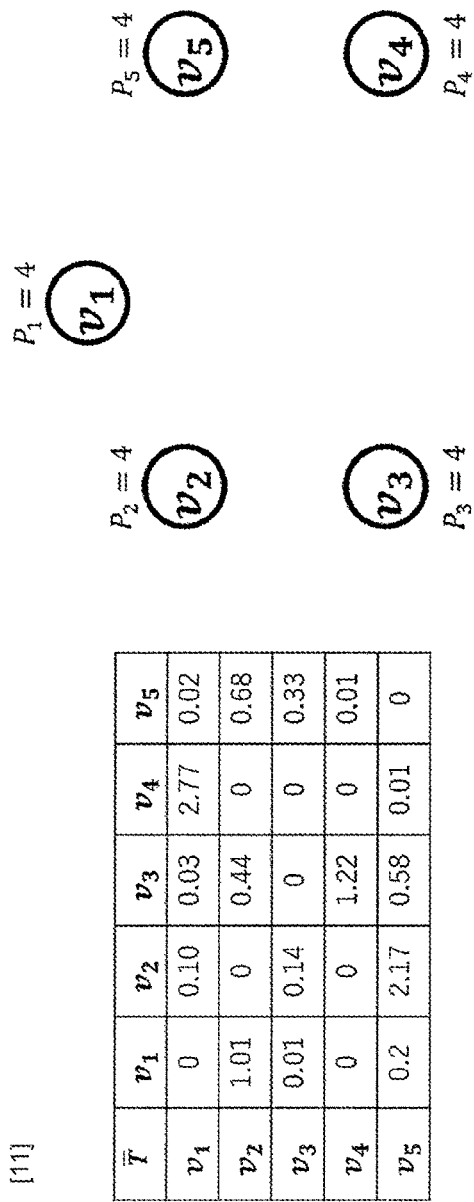
FIG. 11 is an illustrative diagram of an initial state in a network topology configuration example by the second proposed technique.
Figure 12:
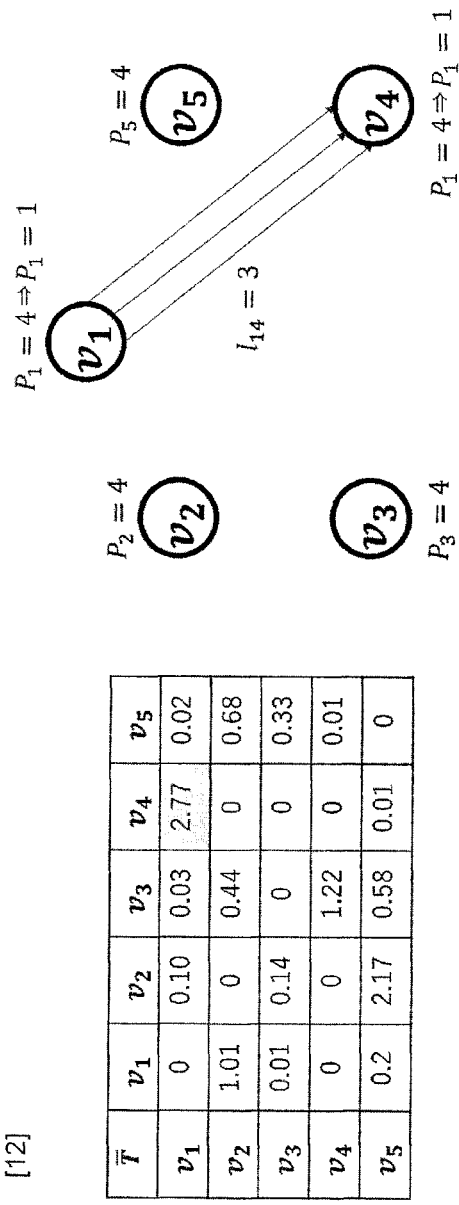
FIG. 12 is an illustrative diagram of steps S21 and S22 in the network topology configuration example by the second proposed technique.

Step S22: links required to accommodate $(t_{i^*j^*}^{max})^{ave}$=2.77 are established between nodes $v_i$ and $v_4$. In the example of FIG. 11, since $l_{i^*j^*}=\lceil 2.77/1.0 \rceil=3$ and there are free ports at both of $v_i$ and $v_4$, $l_{14}=3$ as shown in FIG. 12. In addition, at each of the nodes, the number of free ports is updated.

Figure 13:
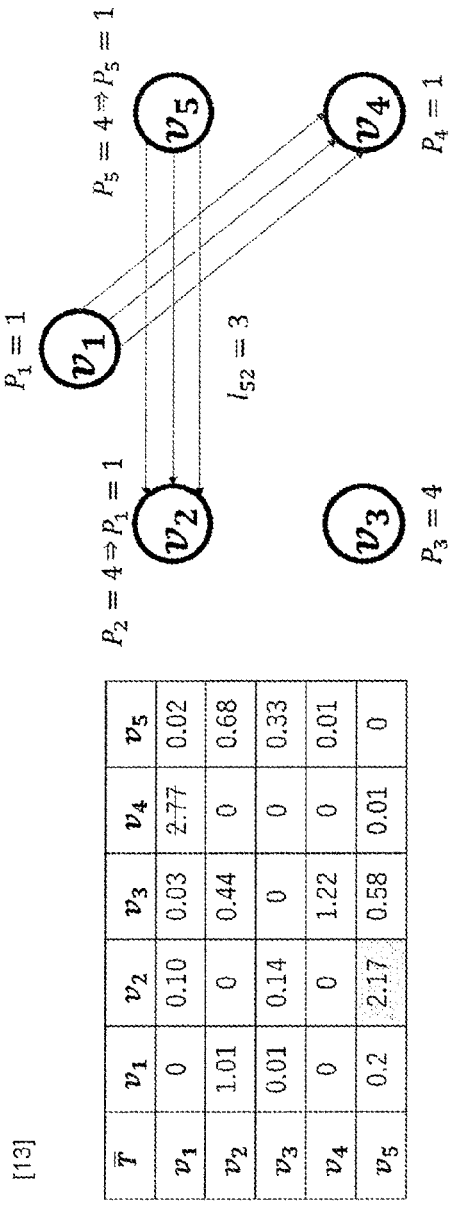
FIG. 13 is an illustrative diagram of steps S21 and S22 in the network topology configuration example by the second proposed technique.
Figure 14:
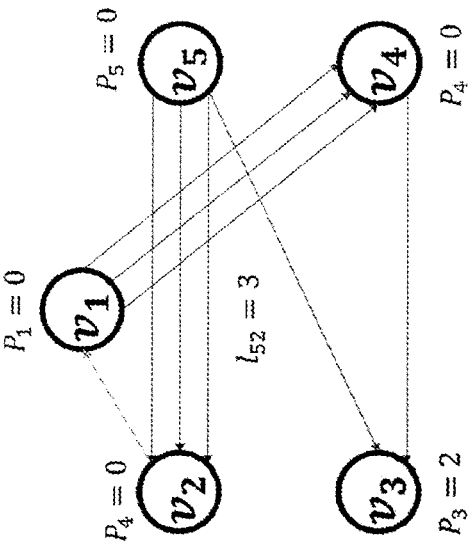
FIG. 14 is an example of a network configuration obtained by the second proposed technique.

Step S21: Excluding the average traffic demand or demands previously examined, a pair of nodes with the largest average traffic demand and its value $(t_{i^*j^*}^{max})^{ave}$ are obtained. As shown in FIG. 13, $v_i^*=v_5$, $v_j^*=2$, and its value $(t_{i^*j^*}^{max})^{ave}$ is 2.17.

Step S22: links required to accommodate $(t_{i^*j^*}^{max})^{ave}$=2.17 are established between nodes $v_5$ and $v_2$. In the example of FIG. 11, since $l_{i^*j^*}=\lceil 2.17/1.0 \rceil=3$ and there are free ports at both of $v_2$ and $v_5$, $l_{52}=3$ as shown in FIG. 13. In addition, at each of the nodes, the number of free ports is updated.

These steps S21 and S22 are repeatedly performed in consideration of the constraint on the number of ports. Steps S21 and S22 terminate when links are established for the traffic demands of all nodes or when there is no free port to which a link with a traffic demand can be established.

Step S23. It is determined that steps S21 and S22 are performed for all traffic demands

[Math. 38]

$$\bar{t}_{ij} \qquad (38)$$

and that there is no free port at each node. When either of these is satisfied, the following step S24 is performed.

Step S24. If there are two or more nodes whose number of free ports $P_i$ is greater than or equal to 1, links are established between those nodes in the order from the highest demand. This operation is performed until the number of nodes is less than or equal to 1.

6. Effects Obtained by the Present Disclosure

The present disclosure makes it possible for a network designer to, based on a set of traffic demand matrices that can occur in a scenario or a model according to a communication service assumed in the future, quickly obtain an approximate solution of a network topology configuration capable of evenly accommodating them. Note that, although a traffic demand matrix whose elements are average values individually occurring between nodes is created in the computation traffic generation unit 12 in the present embodiment, the traffic demand matrix of the present disclosure can adopt any values individually obtained by demands between nodes as elements.

7. Points of the Present Disclosure

In the present disclosure, a method for quickly and approximately calculating a network topology configuration capable of efficiently accommodating a plurality of possible traffic demands between nodes is proposed. First, this problem is formulated as a degree-constrained network design problem, and it is shown that it is difficult to obtain an optimal solution by full search. Thus, two methods of calculating an average or the like of traffic demands individually occurring between nodes for a given set of traffic demand matrices and establishing links between nodes with larger demands on a priority basis based on the traffic demands are proposed. Furthermore, it is shown that the respective computational complexities of these proposed techniques are $O(n^3)$ and $O(n^2)$. Since the computational complexities required by these proposed techniques are much smaller than the computational complexity $O((p+1)^{n(n-1)})$ required by full search, it is possible to quickly obtain an approximate solution of a topology configuration capable of efficiently accommodating a plurality of assumed traffic demands.

INDUSTRIAL APPLICABILITY

The present disclosure can be applied to the information and communication industry.

REFERENCE SIGNS LIST

11: Traffic demand matrix prediction unit
12: Computation traffic generation unit
13: Node information storage unit
14: Network topology generation unit
15: Network topology output unit

The invention claimed is:
1. A method comprising:
predicting a traffic demand that is capable of occurring between nodes present in a target network area under a plurality of conditions, thereby generating a plurality of traffic demand matrices,
generating an average traffic demand matrix from the plurality of traffic demand matrices, where the elements of the average traffic demand matrix are average values obtained from a plurality of demands between the nodes from the plurality of traffic demand;
step a—obtaining a node with a largest traffic demand for each target node present in the target network area by using the average traffic demand matrix;
step b—determining number of links required to accommodate the traffic demand;
step c—determining number of available ports at the obtained node and the target node;
step d—establishing the number of links required to accommodate traffic between the obtained node and the target node and updating available ports at the obtained node and the target if ports are available to support the number of links required;
step e—forego establishing the number of links required to accommodate traffic between the obtained node and the target node if ports are unavailable to support the number of links required; and
repeating steps a-e for all traffic demands.

2. A non-transitory computer-readable medium having computer-executable instructions that, upon execution of the instructions by a processor of a computer, cause the computer to perform:
- predict a traffic demand that is capable of occurring between nodes present in a target network area under a plurality of conditions, thereby generating a plurality of traffic demand matrices,
- generate an average traffic demand matrix from the plurality of traffic demand matrices, where the elements of the average traffic demand matrix are average values obtained by a plurality of demands between the nodes from the plurality of traffic demand;
- step a—obtain a node with a largest traffic demand for each target node present in the target network area by using the average traffic demand matrix;
- step b—determine number of links required to accommodate the traffic demand;
- step c—determine number of available ports at the obtained node and the target node;
- step d—establish the number of links required to accommodate traffic between the obtained node and the target node and updating available ports at the obtained node and the target if ports are available to support the number of links required;
- step e—forego establishing the number of links required to accommodate traffic between the obtained node and the target node if ports are unavailable to support the number of links required; and
- repeat steps a-e for all traffic demands.

3. A device comprising:
- a processor; and
- a storage medium having computer program instructions stored thereon, when executed by the processor, perform to:
- predicting a traffic demand that is capable of occurring between nodes present in a target network area under a plurality of conditions, thereby generating a plurality of traffic demand matrices,
- generating an average traffic demand matrix from the plurality of traffic demand matrices, where the elements of the average traffic demand matrix are average values obtained from a plurality of demands between the nodes from the plurality of traffic demand matrices;
- step a—obtaining a node with a largest traffic demand present in the target network area by using the average traffic demand matrix;
- step b—determining number of links required to accommodate the traffic demand;
- step c—determining number of available ports at the obtained node and the target node;
- step d—establishing the number of links required to accommodate traffic between the obtained node and the target node and updating available ports at the obtained node and the target if ports are available to support the number of links required;
- step e—forego establishing the number of links required to accommodate traffic between the obtained node and the target node if ports are unavailable to support the number of links required; and
- repeating steps a-e for all traffic demands.

* * * * *